350-6.3

XR 3,629,592

United States [11] 3,629,592

| [72] | Inventor | Gilbert Courrier |
| | | Juvisy-sur-Orge, France |
| [21] | Appl. No. | 49,478 |
| [22] | Filed | June 24, 1970 |
| [45] | Patented | Dec. 21, 1971 |
| [73] | Assignee | Compagnie Generale d'Electricite |
| | | Paris, France |
| [32] | Priority | June 27, 1969 |
| [33] | | France |
| [31] | | 6921831 |

[54] OPTICAL MEANS FOR SPACE EXPLORATION
10 Claims, 8 Drawing Figs.

[52] U.S. Cl......................................... 250/216,
350/7, 350/22, 350/32, 350/198
[51] Int. Cl........................................ H01j 3/14,
H01j 5/16
[50] Field of Search............................... 250/216;
350/6, 7, 21, 22, 32, 48, 198

[56] References Cited
UNITED STATES PATENTS

| 2,923,220 | 2/1960 | Bouwers.................... | 350/198 X |
| 3,090,831 | 5/1963 | Schepler................... | 350/208 X |
| 3,356,002 | 12/1967 | Raitiere.................... | 350/32 X |

FOREIGN PATENTS

| 26,820 | 11/1912 | Great Britain............... | 350/198 |
| 1,388,450 | 12/1964 | France....................... | 350/22 |

Primary Examiner—William F. Lindquist
Attorney—Sughrue, Rothwell, Mion, Zinn & Macpeak ABSTRACT: A device enabling the scanning of a space through a wide field, comprising several lenses whose optical axes are concurrent at a point where a field diaphragm directs the light rays coming from space through the lenses towards a photosensitive cell.

PATENTED DEC 21 1971

INVENTOR
GILBERT COURRIER

BY Sughrue, Rothwell, Mion,
Zinn & Macpeak
ATTORNEYS

OPTICAL MEANS FOR SPACE EXPLORATION

BACKGROUND OF THE INVENTION

1. Field of the Invention

The present invention relates to optical means for space exploration, such as those used, for example, in laser cameras.

2. Description of the Prior Art

A laser camera comprises, in principle, a laser generator, of which the light beam is guided in controllable manner by any deflection device permitting a portion of a plane surface to be scanned with the laser beam.

The objects successively illuminated by this laser beam reemit light by reflection or diffusion. The light reemitted by these objects is picked up by an optical exploration means synchronized with the illumination system. The signal received by the optical exploration system is analyzed by suitable detectors, which convert this signal into a datum which can be seen in any desired manner, for example, on a television screen or recorded in a memory in conventional manner for subsequent use.

SUMMARY OF THE INVENTION

The present invention is particularly concerned with the optical system for receiving and analyzing the space illuminated by the laser beam and has for its object a space exploration means, which is characterized in that it comprises a plurality of convergent lenses having substantially the same focal length. They are disposed in such manner that their vertices are disposed substantially on an arc of a circle with a radius smaller than the aforesaid focal length, with their optical axes substantially convergent at the center of the circle so that the foci of the lenses are substantially situated on a circle concentric with said circle. A deviating optical system is disposed in the vicinity of the center of the said circles for directing the images given by the said lenses in the direction of photosensitive analysis means.

Other features and also the advantages provided by the invention will become apparent from the description given in conjunction with the accompanying drawings, which are given by way of illustration but have no limiting character.

DESCRIPTION OF A PREFERRED EMBODIMENT

Figure 1:
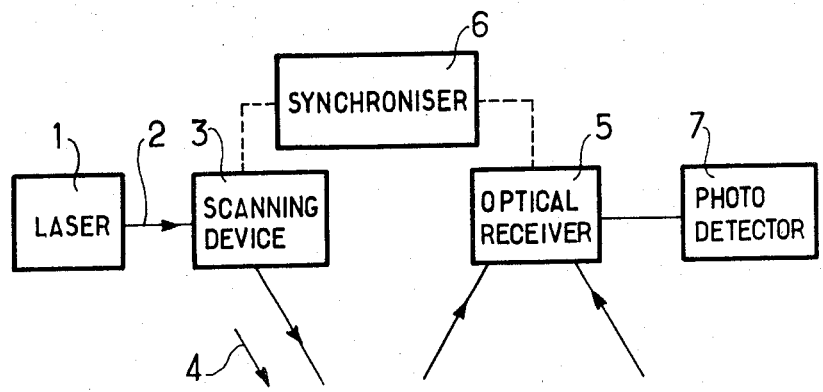
FIG. 1 is a diagram illustrating in general, the principle of a laser camera.

FIG. 1 shows diagrammatically a laser camera comprising a laser 1, of which the light beam 2 can be deviated by a controllable deflection device 3 into a direction defined by the arrow 4. This deflection system 3 is generally a revolving mirror.

The camera also comprises an optical exploration system 5, which is formed by a receiver and an analyzer, one constructional example of which will hereinafter be given.

This exploration system 5 is synchronized with the deflection device 3 by electric or electromagnetic means 6. A data processing device 7 is associated with the exploration system 5 and permits the signals established by the exploration system 5 to be recorded or seen or, in more general terms, to be processed.

Figure 2:
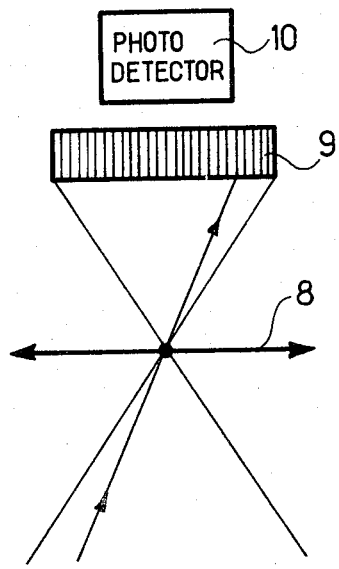
FIG. 2 is a diagram illustrating the principle of a known reception and analysis device.

FIG. 2 shows very diagrammatically one embodiment of the exploration system 5, comprising a receiver formed by a convergent lens 8 and an analyzer formed by a group of optical fibers 9, of which one of the ends is disposed in the focal plane of the lens 8 and of which the other end is explored by a movable detector which is shown very diagrammatically at 10.

The major disadvantage of this arrangement consist in that the use of optical fibers involves an appreciable loss of luminous energy, particularly by absorption, and also in that the use of a single lens is the cause of numerous aberrations, which are due to the relatively broad field which it has to explore.

Figure 3:
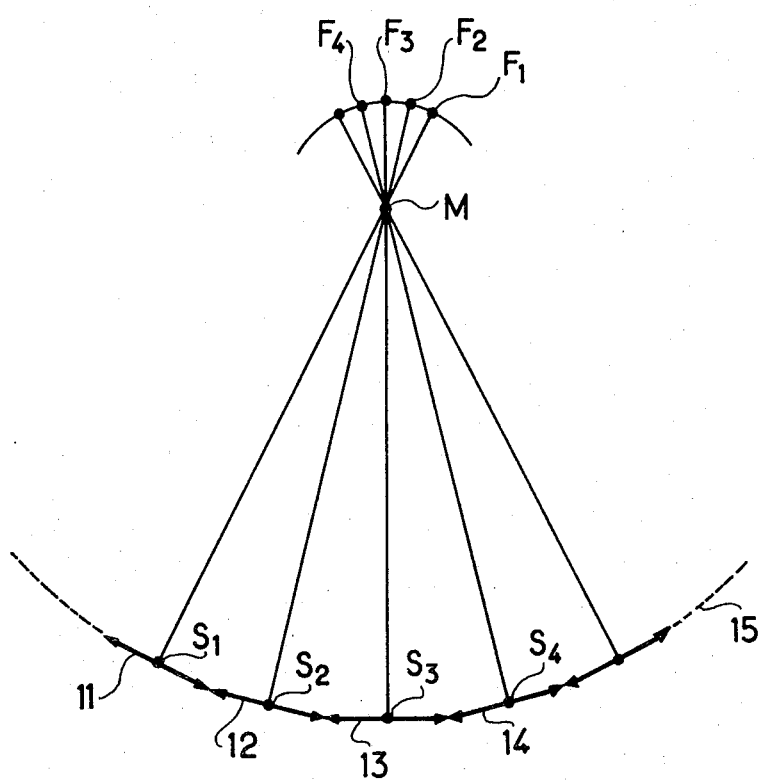
FIG. 3 is a diagram illustrating the principle of a receiver according to the invention.

FIG. 3 shows diagrammatically the receiver section of the exploration system according to the invention, formed by a composite lens comprising a plurality of lenses such as 11, 12, 13, 14, disposed in such a way that their vertices $S_1$, $S_2$, $S_3$ and $S_4$ are advantageously disposed along an arc of a circle 15 and that in addition the optical axes are convergent at a point M, this point being the center of the circle 15. It is advantageous to select lenses of a like focal length which is greater than the radius of the circle 15, the foci $F_1$, $F_2$, $F_3$ and $F_4$ being then for this reason disposed on the arc of a circle having its center at M.

The lenses 11, 12, 13, 14, can be shaped in various ways to form a composite lens according to the present invention. FIGS. 4 to 7 illustrate different types of lenses, which are formed from a spherical segment.

Figure 4:
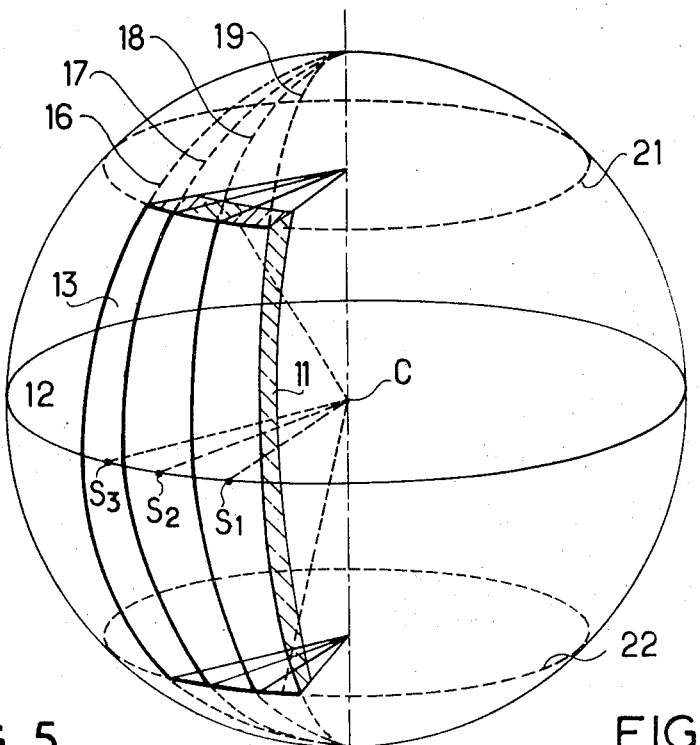
FIGS. 4, 5, 6 and 7 are views illustrating the manner in which the optical elements form a composite lens which is part of the receiver according to FIG. 3.
Figure 5:
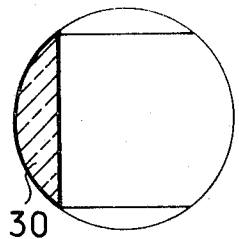
Figure 6:
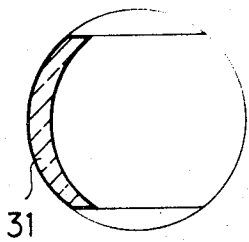
Figure 7:
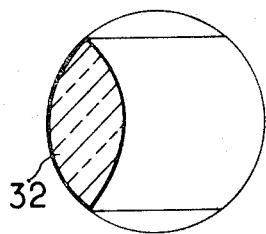

FIG. 4 shows the outline of a sphere 20 cut into sections along meridianal planes, of which there are shown at 16, 17, 18 and 19 portions of circles which they cut on the sphere 20, and along two parallel planes cutting the sphere along two circles 21 and 22. The face facing the center of the sphere can be obtained by effecting a shaping as illustrated in FIGS. 5, 6 and 7. By way of example, starting from a surface, it is possible to produce either a planoconvex lens 30, of which the meridianal section is illustrated by FIG. 5, or a lens of the "meniscus" type 31, such as illustrated by the meridianal section of FIG. 6, or even a biconvex lens 32, illustrated by the meridianal section of FIG. 7.

Figure 8:
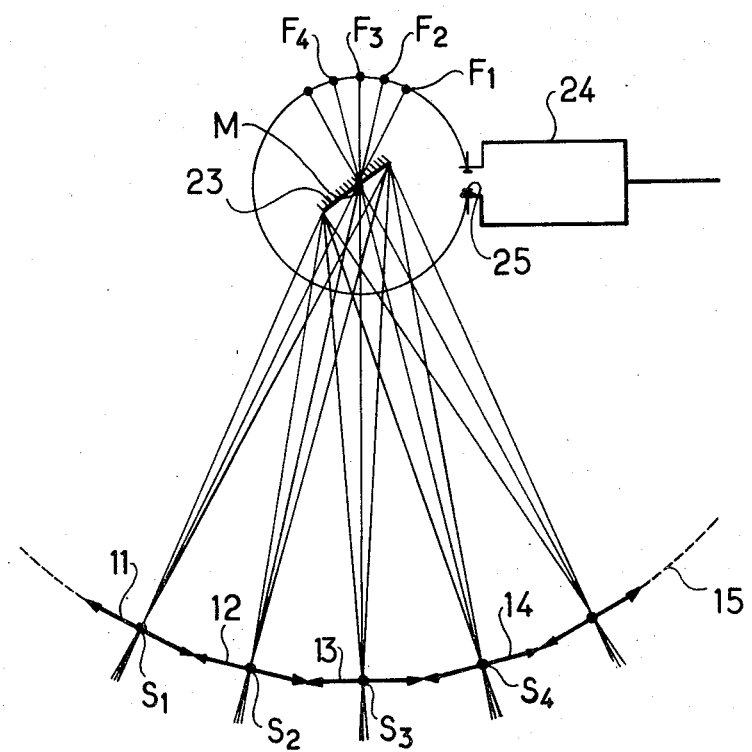
FIG. 8 is a diagram illustrating the principle of an exploration means according to the invention, comprising a composite lens according to FIG. 3 and an analysis device according to the invention.

According to the present invention, and as illustrated by FIG. 8, the composite lens illustrated by FIG. 3 is associated with an analyzer formed of a field diaphragm which is advantageously provided by a mirror 23 capable of turning about an axis passing through the point M. This axis is parallel to the axis which was defined in FIG. 4 as a convergent straight line of all the meridianal planes cutting the lenses 11, 12, 13, 14, and perpendicularly to the plane of the circle 15. The optical axes are directed in such a way that they converge at the point M defined above. A photosensitive detector 24 is so disposed as to receive the light rays reflected on the mirror 23 and coming from the object emitting light through the composite lens. The detector 24 is disposed so that its sensitive part is preferably on the circle passing through the different foci $F_1$, $F_2$, $F_3$, $F_4$, this enabling sharp images to be obtained on the said detector; this detector can with advantage comprise, for example, a diaphragm 25 for reducing its sensitive surface.

It is obvious that the lenses, such as those which are represented at 11, 12, 13, 14, and which are used for providing the composite lens, can be given radii of curvature and thicknesses permitting aberrations to be corrected. It is also possible to employ lenses made of glasses of different index or even to give the lenses very slightly different radii of curvature and focal lengths, so as to improve the correction of the total aberrations of the receiver formed by the composite lens.

A laser camera system according to the invention and as described in detail above can advantageously be mounted on board a vehicle, such as for example a reconnaissance aircraft, to obtain an image of the ground passing beneath the aircraft in the form of a sequential analysis equivalent to a television image.

What is claimed is:

1. Optical means for space exploration, comprising:
   a plurality of convergent lenses having substantially the same focal length, means for disposing said lens such that their vertices lie substantially on an arc of a first circle with a radius smaller than the aforesaid focal length and such that their optical axes are substantially convergent at the center of the said first circle so that the foci of the said lenses are disposed substantially on a second circle concentric with said first circle, photosensitive analysis means, and an optical deviating system disposed in the vicinity of the center of the said circles for deviating the images given by the said lenses in the direction of said photosensitive analysis means.

2. The optical means according to claim 1, wherein said photosensitive means are disposed in a fixed manner.

3. The optical means for space exploration according to claim 1, wherein said deviating optical system comprises a field diaphragm for the said lenses.

4. The optical means for space exploration according to claim 1, wherein said photosensitive means are provided with a field diaphragm.

5. The optical means for space exploration according to claim 1, wherein said deviating optical system comprises a mirror having a rotational movement about an axis passing through the center of the said circles and perpendicular to the plane of the said circles.

6. The optical exploration means according to claim 1, wherein said lenses each comprise a spherical segment defined by two meridianal planes and two parallel planes situated on either side of the center of this sphere and perpendicular to the diameter defined by the intersection of two meridianal planes.

7. The optical exploration means according to claim 1, wherein the lenses are biconvex lenses.

8. The optical means according to claim 1, wherein said lenses are meniscus lenses.

9. The optical exploration means according to claim 1, wherein said lenses are planoconvex lenses.

10. The optical exploration means according to claim 1, further comprising a laser generator and a deflection device synchronized with said deviating system, for directing said beam in a controllable manner onto the spatial object for reflection onto said deviating system.

* * * * *